E. A. WOLFE & H. W. GILBERT.
DRIVING CONNECTION.
APPLICATION FILED NOV. 7, 1911.
1,037,393.
Patented Sept. 3, 1912.
2 SHEETS—SHEET 1.
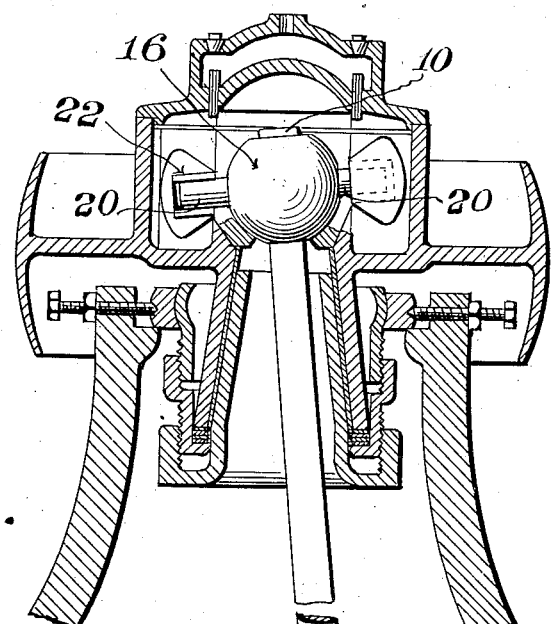
Fig. 1.
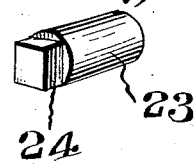
Fig. 7.
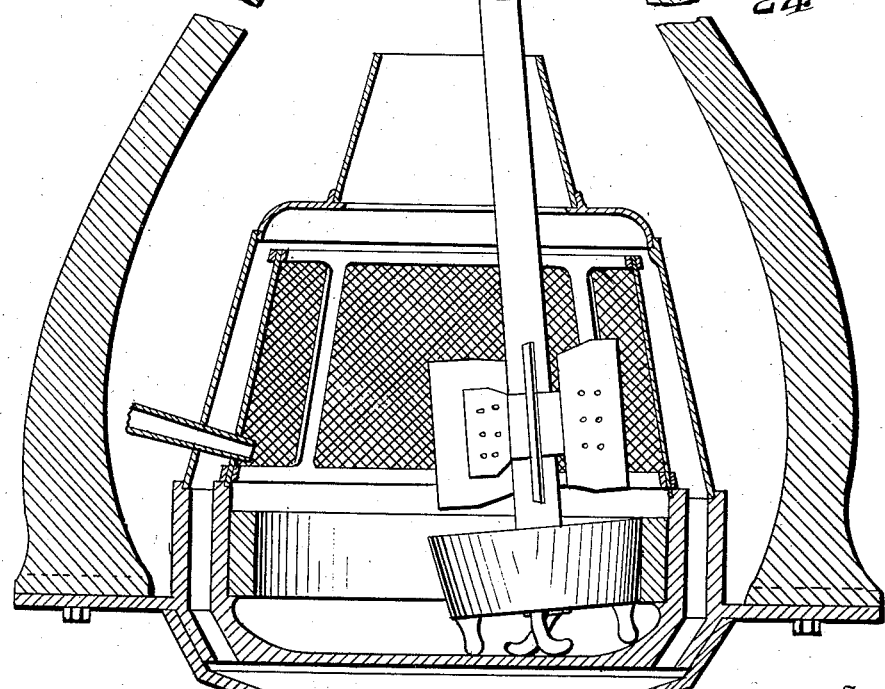
Witnesses:
Inventors:
E. A. Wolfe,
H. W. Gilbert.
By Harry Ellis Chandlee
Attorney

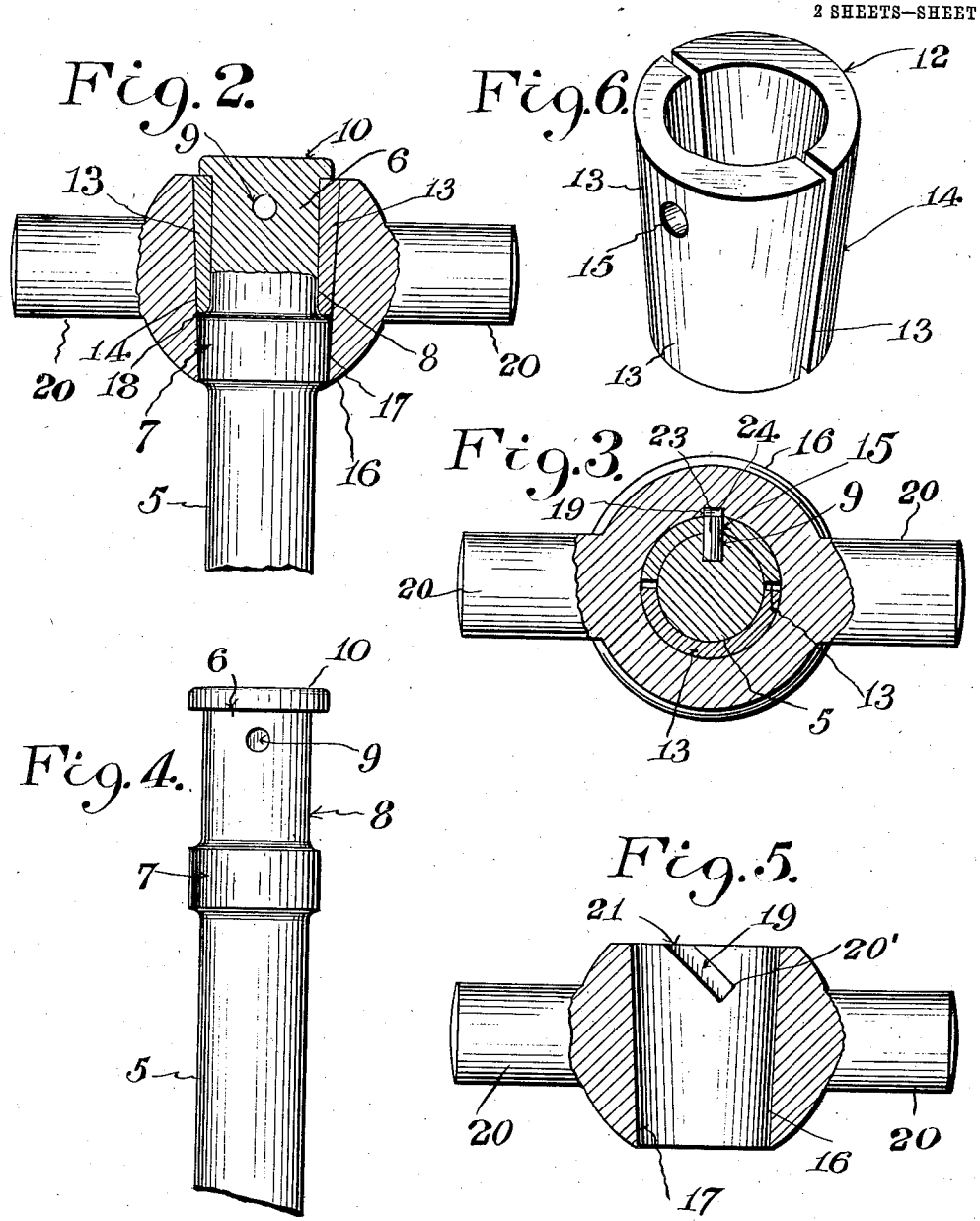

UNITED STATES PATENT OFFICE.

ELVIN A. WOLFE AND HOWARD W. GILBERT, OF NAZARETH, PENNSYLVANIA.

DRIVING CONNECTION.

1,037,393.

Specification of Letters Patent. Patented Sept. 3, 1912.

Application filed November 7, 1911. Serial No. 658,982.

*To all whom it may concern:*

Be it known that we, ELVIN A. WOLFE and HOWARD W. GILBERT, citizens of the United States, residing at Nazareth, in the county of Northampton and State of Pennsylvania, have invented certain new and useful Improvements in Driving Connections, of which the following is a specification.

This invention relates to an improvement in mills, and particularly of that type known as "Griffin Mills," such as for instance, as shown in the patent issued to E. C. Griffin, March 31, 1891, Number 449,118.

The principal object of the invention is to provide a novel universal joint connection for the roll shaft whereby said shaft will be prevented from breaking and rising when rotating, and yet permit of the ready disassembling of the parts.

Another object of the invention is to provide a universal joint connection which is composed of a minimum number of parts, is therefore simple in construction, and is cheap to manufacture.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction within the scope of the claims, may be resorted to without departing from the spirit or sacrificing any of the advantages of the invention.

In the drawings:—Figure 1 is a detail vertical sectional view through a mill equipped with our invention, parts thereof being shown in elevation, Fig. 2 is a detail longitudinal sectional view through such a connection, Fig. 3 is a detail cross sectional view, Fig. 4 is a detail elevation of the upper end of the shaft, Fig. 5 is a view partly in elevation and partly in section of the ball and trunnions, Fig. 6 is a perspective view of the split bushing, and Fig. 7 is a perspective view of the locking pin.

Like reference numerals designate corresponding parts in all the figures of the drawings.

Referring to the drawings, the invention comprises a roll-shaft 5, which is normally disposed vertically. The shaft, below the upper end 6 and in spaced relation thereto, is enlarged to form a shoulder 7 and a consequent bearing 8. Formed in the bearing 8 is an inwardly extending recess 9 adapted for a purpose hereinafter more fully described. Integral with the end 6 of the shaft is a cap 10.

Disposed upon the bearing 8 is a split bushing which is designated as a whole by the reference numeral 12, and consists of two sections 13—13, the outer surfaces 14—14 of said sections conjointly tapering downwardly. One of these sections is formed with a transverse opening 15 which registers with the recess 9 of the shaft.

Our invention further comprises a ball 16 which is centrally formed with tapering bore 17 corresponding in size to and adapted to be disposed around the bushing 12. The lower edge 18 of this bushing is concentrically formed, and is disposed over the shoulder 7 formed on the said shaft. Formed in the upper portion of the wall of the bore 17 is a short helical groove 19, the inner end thereof forming a consequent stop 20', and the outer end 21 thereof merging with the top of said ball. This groove is adapted to register with the recess 9 of the shaft and the opening 15 of the bushing. Integral with the ball and projecting outwardly at diametrically opposite points are trunnions 20—20 which are adapted to be disposed in seats of the pulley 22 of the ordinary Griffin Mill, as illustrated in Fig. 1 of the drawings. Inasmuch as the construction of the pulley is well known, it is deemed unnecessary to specifically describe the same.

In practice, when it is desired to assemble the parts, a locking pin 23 has one end disposed within the recess 9 of the shaft. The sections 13 of the bushing 12 are then disposed upon the bearing 8 in such a manner that the opening 15 of the proper section receives the said pin 23. The outer end of the pin projects beyond the bushing and is formed with an angular end 24. The ball 16 which carries the trunnions 20 is then slid upwardly along the shaft 5 over the shoulder 7 and upon the bushing 12, the helical groove 19 receiving the angular end 24 of said locking pin. As a result of this construction, it will be observed that as the shaft is rotated to the right, the angular end 24 of the pin will abut the inner end or stop 20' of said groove 19, and as a result any tendency of the shaft to rise will be prevented as will be readily apparent. It is to be further observed that on account of the inclined bore 17 of the ball and the corresponding shaped outer face of the bushing, any tendency of said bushing to move downwardly will be prevented. It will also be observed that the diameter of the cap 10 is greater than the inner diameter of the bushing, and as a result, the peripheral edge of the cap will rest upon said bushing, and thereby tend to support the shaft. It is to be also observed that by means of the locking pin 23 the shaft 5, the bushing 12 and ball 16 are locked to rotate together, yet permitting of the parts to be readily disassembled upon the reverse rotation of said shaft.

What is claimed is:

1. In combination with a shaft having a shoulder formed thereon to form a consequent bearing, of a bushing disposed on said bearing against the shoulder, a pin connecting the bushing and shaft and projecting outwardly beyond said bushing, and a ball disposed around said bushing and having its bore formed with a helical groove for receiving the projecting end of said pin.

2. In combination with a shaft having a shoulder formed thereon to form a consequent bearing, said shaft having a recess formed therein, of a bushing mounted on said bearing formed with an opening registering with said recess, a pin seated within said opening and recess and projecting beyond the bushing, and a ball having its bore disposed around the bushing, the bore being formed with a helical groove for receiving the projecting end of the pin.

3. In combination with a shaft having a shoulder formed thereon to form a consequent bearing, of a bushing disposed on said bearing against the shoulder, the outer surface of said bushing tapering toward the shoulder, a pin connecting the bushing and shaft and projecting outwardly beyond said bushing, and a ball disposed around said bushing and having its bore correspondingly tapered to fit the bushing, said bore being formed with a helical groove for receiving the projecting end of the pin.

In testimony whereof we affix our signatures, in presence of two witnesses.

ELVIN A. WOLFE.
HOWARD W. GILBERT.

Witnesses:
LE ROY G. PETERS,
JOSEPH H. SIGMAN.